(12) United States Patent
Racape

(10) Patent No.: US 7,855,591 B2
(45) Date of Patent: Dec. 21, 2010

(54) METHOD AND SYSTEM FOR PROVIDING A CHARGE PUMP VERY LOW VOLTAGE APPLICATIONS

(75) Inventor: Emmanuel Racape, Aix-en-Provence (FR)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 11/449,052

(22) Filed: Jun. 7, 2006

(65) Prior Publication Data
US 2007/0285150 A1    Dec. 13, 2007

(51) Int. Cl.
    *G05F 1/10*    (2006.01)
(52) U.S. Cl. ..................................... 327/536
(58) Field of Classification Search .............. 327/535, 327/536, 537
    See application file for complete search history.

(56) References Cited

U.S. PATENT DOCUMENTS

| | | | |
|---|---|---|---|
| 4,581,546 A | 4/1986 | Allan | |
| 5,196,996 A | 3/1993 | Oh | |
| 5,352,936 A | 10/1994 | Allen | |
| 5,546,296 A | 8/1996 | Savignac et al. | |
| 5,644,534 A | 7/1997 | Soejima | |
| 5,808,506 A | 9/1998 | Tran | |
| 5,812,018 A | 9/1998 | Sudo et al. | |
| 5,818,289 A | 10/1998 | Chevallier et al. | |
| 5,874,850 A | 2/1999 | Pulvirenti et al. | |
| 5,889,428 A | 3/1999 | Young | |
| 5,943,271 A | 8/1999 | Tetsuya | |
| 6,023,188 A | 2/2000 | Lee et al. | |
| 6,026,003 A | 2/2000 | Moore et al. | |
| 6,043,716 A | 3/2000 | Warner | |

(Continued)

FOREIGN PATENT DOCUMENTS

WO    WO-05065138 A2    7/2005

(Continued)

OTHER PUBLICATIONS

John G. Dickson, On-Chip High-Voltage Generation in MNOS Integrated Circuits Using an Improved Voltage Multiplier Technique, IEEE Journal of Solid-State Circuits, vol. SC-11, No. 3, Jun. 1976.

(Continued)

*Primary Examiner*—Jeffrey S Zweizig
(74) *Attorney, Agent, or Firm*—Schwegman, Lundberg & Woessner, P.A.

(57) ABSTRACT

A method and system for providing an output voltage greater than a voltage provided by a voltage supply in a semiconductor device are disclosed. The method and system include providing a plurality of clock signals, providing a first stage and providing a second stage. The first stage includes at least a first pumping node, a pumping capacitor and a device coupled with the pumping node, and an auxiliary capacitor pair for providing an undershoot for the device for value(s) of the clock. The auxiliary and pumping capacitors receive a first portion of the clock signals. The second stage includes at least a second pumping node. The first and second portions of the clock signals are provided to the first and second stages, respectively. The first stage and the second stage are configured to alternately charge and fully discharge based on the clock signals.

32 Claims, 5 Drawing Sheets

U.S. PATENT DOCUMENTS

| | | | |
|---|---|---|---|
| 6,100,557 | A | 8/2000 | Hung et al. |
| 6,130,574 | A | 10/2000 | Bloch et al. |
| 6,163,487 | A | 12/2000 | Ghilardelli |
| 6,166,585 | A | 12/2000 | Bazzani |
| 6,175,264 | B1 | 1/2001 | Jinbo |
| 6,198,342 | B1 | 3/2001 | Kawai |
| 6,285,240 | B1 | 9/2001 | Shiau et al. |
| 6,292,048 | B1 | 9/2001 | Li |
| 6,353,356 | B1 | 3/2002 | Liu |
| 6,359,500 | B1 | 3/2002 | Zanuccoli et al. |
| 6,418,040 | B1 | 7/2002 | Meng |
| 6,429,723 | B1 | 8/2002 | Hastings |
| 6,437,637 | B2 | 8/2002 | Myono |
| 6,448,841 | B1 | 9/2002 | Milazzo |
| 6,448,842 | B2 | 9/2002 | Zanuccoli et al. |
| 6,452,438 | B1 | 9/2002 | Li |
| 6,466,079 | B1 | 10/2002 | Kushnarenko |
| 6,480,057 | B2 | 11/2002 | Ogura |
| 6,515,535 | B2 | 2/2003 | Myono |
| 6,515,903 | B1 | 2/2003 | Le et al. |
| 6,552,600 | B2 | 4/2003 | Walimbe et al. |
| 6,664,846 | B1 | 12/2003 | Maung et al. |
| 6,674,317 | B1 | 1/2004 | Chou |
| 6,677,805 | B2 | 1/2004 | Shor et al. |
| 6,677,806 | B2 * | 1/2004 | Bloch ................. 327/536 |
| 6,696,883 | B1 | 2/2004 | Wilson |
| 6,720,822 | B2 | 4/2004 | Torrisi et al. |
| 6,734,717 | B2 | 5/2004 | Min |
| 6,876,244 | B1 | 4/2005 | Moraveji |
| 6,927,441 | B2 | 8/2005 | Pappalardo et al. |
| 6,952,129 | B2 * | 10/2005 | Lin et al. ................. 327/536 |
| 7,046,076 | B2 * | 5/2006 | Daga et al. ................. 327/536 |
| 7,652,522 | B2 | 1/2010 | Racape et al. |
| 2002/0114199 | A1 | 8/2002 | Negoi |
| 2002/0122324 | A1 | 9/2002 | Kim et al |
| 2002/0125935 | A1 | 9/2002 | Sawada et al. |
| 2002/0190780 | A1 | 12/2002 | Bloch |
| 2003/0006824 | A1 | 1/2003 | Lin et al. |
| 2003/0034827 | A1 | 2/2003 | Pagliato et al. |
| 2003/0214346 | A1 | 11/2003 | Pelliconi |
| 2004/0057259 | A1 | 3/2004 | Oddone et al. |
| 2004/0104761 | A1 | 6/2004 | Yen |
| 2004/0263238 | A1 | 12/2004 | Thorp et al. |
| 2005/0065138 | A1 | 3/2005 | Didier et al. |
| 2005/0212586 | A1 | 9/2005 | Daga et al. |
| 2006/0273843 | A1 | 12/2006 | Daga et al. |
| 2007/0285150 | A1 | 12/2007 | Racape |
| 2008/0042731 | A1 | 2/2008 | Daga et al. |
| 2008/0122506 | A1 | 5/2008 | Racape |

FOREIGN PATENT DOCUMENTS

| | | | |
|---|---|---|---|
| WO | WO-2005065138 | A2 | 7/2005 |
| WO | WO-06132757 | A2 | 12/2006 |
| WO | WO-2007146002 | A2 | 12/2007 |
| WO | WO-2007146002 | A3 | 12/2007 |
| WO | WO-2008030728 | A2 | 3/2008 |

OTHER PUBLICATIONS

Hongchin Lin, et al., A New 4-Phase Charge Pump Without Body Effects for Low Supply Voltages, Proc. ISCAS'2001.

Jean-Michel Daga, et al., High Efficiency Bi-Directional Charge Pump Circuit, U.S. Appl. No. 11/221,309, Sep. 7, 2005.

Emmanuel Recape, High Efficiency Low Cost Bi-Directional Charge Pump Circuit for Very Low Voltage Applications, U.S. Appl. No. 11/515,637, Sep. 5, 2006.

"U.S. Appl. No. 10/810,033, Amendment and Response filed Dec. 19, 2005 to Non-Final Office Action Jun. 17, 2005", 32 pgs.

"U.S. Appl. No. 10/810,033, Non-Final Office Action mailed Jun. 17, 2005", 8 pgs.

"U.S. Appl. No. 10/810,033, Notice of Allowance mailed Jan. 31, 2006", 4 pgs.

"U.S. Appl. No. 11/515,637, Non-Final Office Action mailed Apr. 30, 2008", 3 pgs.

Dickson, J. F., " On-chip high-voltage generation in MNOS integrated circuits using an improved voltage multiplier technique", *IEEE Journal of Solid-State Circuits*, 11(3), (Jun. 1976), 374-378.

Favrat, Pierre, et al., "A new high efficiency CMOS voltage doubler", *Proceedings of the IEEE 1997 Custom Integrated Circuits Conference*, (1997), 259-262.

Lee, S.-C., et al., " A Low-Ripple Switched-Capacitor DC-DC up Converter for Low-Voltage Applications", *IEICE Transactions on Electronics*, vol. E84-C No. 8, (Aug. 2001), 1100-1103.

Lin, H., et al., "New four-phase generation circuits for low-voltage charge pumps", *The 2001 IEEE International Symposium on Circuits and Systems*, 2001. ISCAS 2001, vol. 1, (May 6-9, 2001), 504-507.

Min, K-S., et al., "CMOS Charge Pumps Using Cross-Coupled Charge Transfer Switches with Improved Voltage Pumping Gain and Low Gate-Oxide Stress for Low-Voltage Memory Circuits", *IEICE Transactions on Electronics*, vol. E85-C No. 1, (Jan. 2002), 225-229.

"U.S. Appl. No. 11/515,637, Final Office Action Mailed On Oct. 22, 2008", 6 Pgs.

"U.S. Appl. No. 11/515,637, Response filed Sep. 2, 2008 to Non-Final Office Action mailed Apr. 30, 2008", 18 pages.

"U.S. Appl. No. 11/927,298, Non-Final Office Action mailed on Oct. 30, 2008", 6 Pgs.

"Chinese Application Serial No. 200480041674.0, Office Action mailed Jul. 4, 2008", 13.

Khouri, O., et al., "Improved Charge Pump for Flash Memory Applications in Triple-Well CMOS Technology", *Industrial Electronics, 2002, ISIE 2002, Proceedings of the 2002 IEEE Int'l Symposium*, vol. 4, (Jul. 8-11, 2002), 1322-1326.

Lin, H., et al., "A New 4-Phase Charge Pump Without Body Effects for Low Supply Voltages", *Proceedings of the 2002 IEEE Asia-Pacific Conference, ASIC 2002*, (Aug. 6-8, 2002), 53-56.

Pelliconi, R., et al., "Power Efficient Charge Pump in Deep Submicron Standard CMOS Technology", *IEEE Journal of Solid-State Circuits*, vol. 38, No. 6, (Jun. 2003), 1068-1071.

"U.S. Appl. No. 11/221,309, Response filed Mar. 28, 2007 to Non-Final Office Action mailed Oct. 17, 2006", 20 pgs.

"U.S. Appl. No. 11/221,309, Advisory Action mailed Apr. 17, 2008", 3 pgs.

"U.S. Appl. No. 11/221,309, Final Office Action mailed Sep. 12, 2007", 6 pgs.

"U.S. Appl. No. 11/221,309, Non-Final Office Action mailed May 17, 2007", 3 pgs.

"U.S. Appl. No. 11/221,309, Non-Final Office Action mailed Oct. 17, 2006", 7 pgs.

"U.S. Appl. No. 11/221,309, Response filed Jul. 30, 2007 to Non-Final Office Action mailed May 17, 2007", 18 pgs.

"U.S. Appl. No. 11/221,309, Response filed Oct. 29, 2007 to Final Office Action mailed Sep. 12, 2007", 27 pgs.

"U.S. Appl. No. 11/515,637, Notice of Allowance mailed Mar. 24, 2009", 16 pgs.

"U.S. Appl. No. 11/515,637, Response filed Jan. 22, 2009 to Final Office Action mailed Oct. 22, 2008", 11 pgs.

"U.S. Appl. No. 11/927,298, Final Office Action mailed Mar. 20, 2009", 5 pgs.

"U.S. Appl. No. 11/927,298, Response filed Jan. 30, 2009 to Non-Final Office Action mailed Oct. 30, 2008", 6 pgs.

200480041674.0, "Chinese Application Serial No. 200480041674.0, Office Action mailed Feb. 20, 2009".

"U.S. Appl. No. 11/515,637, Notice of Allowance mailed Sep. 8, 2009", 16 Pgs.

"U.S. Appl. No. 11/927,298, Non-Final Office Action mailed Aug. 25, 2009", 7 pgs.

"U.S. Appl. No. 11/927,298, Response filed Jun. 22, 2009 to Final Office Action mailed Mar. 20, 2009", 6 pgs.

"International Application Serial No. PCT/US07/13328, International Search Report mailed Apr. 23, 2008", 1 pg.

"International Application Serial No. PCT/US07/13328, Written Opinion mailed Apr. 23, 2008", 3 pgs.

"U.S. Appl. No. 11/927,298, Final Office Action mailed Mar. 23, 2010", 8 pgs.

"U.S. Appl. No. 11/927,298, Response filed Jan. 25, 2010 to Non Final Office Action mailed Aug. 25, 2009", 11 pgs.

"Chinese Application Serial No. 200480041674.0, Response filed Jan. 1, 2009 to Office Action mailed Jul. 4, 2008", (w/ English Translation of Amended Claims), 6 pgs.

"International Application Serial No. PCT/US04/41287, International Preliminary Report on Patentability completed Feb. 13, 2006", 3 pgs.

"International Application Serial No. PCT/US04/41287, International Search Report mailed Jul. 6, 2005", 1 pg.

"International Application Serial No. PCT/US04/41287, Written Opinion mailed Jul. 6, 2005", 3 pgs.

"International Application Serial No. PCT/US06/18299, International Preliminary Report on Patentability mailed Jun. 27, 2007", 28 pgs.

"International Application Serial No. PCT/US06/18299, International Search Report mailed Dec. 18, 2006", 1 pg.

"International Application Serial No. PCT/US06/18299, Written Opinion mailed Dec. 18, 2006", 5 pgs.

"International Application Serial No. PCT/US2007/076926, International Preliminary Report on Patentability completed Nov. 18, 2008", 6 pgs..

"International Application Serial No. PCT/US2007/076926, International Search Report mailed Apr. 4, 2008", 2 pgs.

"Internationai Application Serial No. PCT/US2007/076926, Written Opinion maiied Apr. 4, 2008", 6 pgs.

"Chinese Application Serial No. 200480041674.0, Response filed Jan. 15, 2009 to Office Action mailed Jul. 4, 2008", (English Translation), 2 pgs.

"U.S. Appl. No. 11/927,298, Non-Final Office Action mailed Jul. 12, 2010", 11 pgs.

"U.S. Appl. No. 11/927,298, Response flied Jun. 23, 2010 to Final Office Action mailed Mar. 23, 2010", 13 pgs.

"Chinese Application Serial No. 2007800209956, Office Action mailed May 20, 2010", 14 Pgs.

\* cited by examiner

METHOD AND SYSTEM FOR PROVIDING A CHARGE PUMP VERY LOW VOLTAGE APPLICATIONS

FIELD OF THE INVENTION

The present invention relates to semiconductor technology and more particularly to generation of higher voltage in low voltage devices.

BACKGROUND OF THE INVENTION

Semiconductor devices, such as EEPROMs or Flash devices, may be desired to be run using a voltage supply that provides a lower supply voltage. The lower supply voltage allows the device to consume less power and be shrunk to smaller geometries. For example, lower voltages are desired for applications such as EEPROMs used in smart cards. Although lower supply voltages are desired for the semiconductor devices, higher voltages may be desired for certain operations. For example, a voltage that is higher than the supply voltage may be required for operations such as programming memory cells. In order to obtain the higher voltages, a conventional charge pump may be used.

FIG. 1 depicts a conventional charge pump 10, which can be used to increase voltages above the supply voltage or provide a reverse polarity voltage. The conventional charge pump 10 includes a conventional capacitor-diode ladder 12 and a conventional oscillator 20 coupled with a voltage supply 22. The conventional capacitor-diode ladder 12 includes capacitor-diode pairs 13 (including capacitor 14 and diode 24), 15 (including capacitor 16 and diode 26), and 17 (that includes capacitor 18 and diode 28). The conventional oscillator 20 outputs clocks signals CLK and CLKB. The diodes 24, 26, and 28 are typically NMOS devices that function as diodes. The signal CLKB is the inverse of the signal CLK.

Based on the signals CLK and CLKB, the capacitor-diode pairs 13, 15, and 17 alternately charge to approximately the supply voltage and discharge. For example, the capacitor-diode pair 13 charges the capacitor 14, then discharges the capacitor 14 and transfers the energy to the next capacitor-diode pair 15. The charging and discharging of capacitors 14, 16, and 18 in the capacitor-diode ladder 12 allows for energy to be transferred between capacitor-diode pairs 13, 15, and 17, and output. This energy is also transferred at the output 30 of the conventional charge pump 10 by an output current provided at the output 30. The conventional charge pump 10, has a gain per capacitor-diode pair of $V_{dd} - V_t$, where $V_{dd}$ is the supply voltage and $V_t$ is the threshold voltage of the NMOS devices 24, 26, and 28. Thus, a voltage above that of the conventional voltage supply 22 can be provided.

Although the conventional charge pump 10 functions, one of ordinary skill in the art will readily recognize that the conventional charge pump 10 may have significant drawbacks, particularly for lower supply voltages. The number of capacitor-diode pairs, such as the capacitor-diode pairs 13, 15, and 17, that can be cascaded is limited by the amount of the voltage drop increase between the source and the bulk of an NMOS device in the capacitor-diode pairs 13, 15, and 17. This drop results in a dramatic increase in the threshold voltage in the final stages. Consequently, a limited number of capacitor-diode pairs and, therefore, a limited gain may be achieved. Another drawback is that thick oxide, high voltage dedicated transistors are necessary to reliably sustain a large voltage drop between gate and bulk. Thus, thin oxide, low voltage standard devices which can sustain a maximum drop of $V_{dd}$ may not be used in the conventional charge pump 10.

Moreover, when used in applications using a low supply voltage, the charge pump 10 provides a lower output current from the output 30 because charge is output at a lower rate from the capacitor-diode ladder 12. Furthermore, the high voltage from the conventional charge pump 10 may be on the order of the breakdown voltage of devices to which the voltage is applied, inducing breakdown leakage. As the output current of the conventional charge pump 10 decreases, the effect of the leakage becomes more marked. As a result, the ability of the conventional charge pump 10 to provide a sufficient output current in combination with a high voltage may be adversely affected.

Accordingly, what is needed is an improved method and system for providing a voltage higher than the supply voltage, particularly in lower supply voltage devices. The present invention addresses such a need.

BRIEF SUMMARY OF THE INVENTION

The present invention provides a method and system for providing an output voltage greater than a voltage provided by a voltage supply in a semiconductor device. The method and system comprise providing a plurality of clock signals, providing a first stage and providing a second stage. The first stage includes at least a first pumping node, at least one pumping capacitor coupled with the at least first pumping node, at least one device coupled with the at least one pumping node, and at least a first and a second auxiliary capacitor for providing an undershoot for the at least one device for at least one value of the plurality of clock signals. The at least one auxiliary capacitor and the at least one pumping capacitor receive the first portion of the plurality of clock signals. The second stage includes at least a second pumping node. A first portion of the plurality of clock signals is provided to the first stage, while a second portion of the plurality of clock signals is provided to the second stage. The first stage and the second stage are configured to alternately charge and fully discharge based on the plurality of clock signals.

According to the method and system disclosed herein, the present invention provides a higher voltage in low voltage devices, such as lower voltage EEPROMS. In particular, the method and system may function for supply voltages approaching the threshold voltage of the at least one device.

DETAILED DESCRIPTION OF THE INVENTION

The present invention relates to semiconductor processing. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for providing an output voltage greater than a voltage provided by a voltage supply in a semiconductor device. The method and system comprise providing a plurality of clock signals, providing a first stage and providing a second stage. The first stage includes at least a first pumping node, at least one pumping capacitor coupled with the at least first pumping node, at least one device coupled with the at least one pumping node, and at least one auxiliary capacitor for providing an undershoot for the at least one device for at least one value of the plurality of clock signals. The at least one auxiliary capacitor and the at least one pumping capacitor receive the first portion of the plurality of clock signals. The second stage includes at least a second pumping node. A first portion of the plurality of clock signals is provided to the first stage, while a second portion of the plurality of clock signals is provided to the second stage. The first stage and the second stage are configured to alternately charge and fully discharge based on the plurality of clock signals.

The present invention will be described in terms of a semiconductor device having particular components. However, one of ordinary skill in the art will readily recognize that the method and system in accordance with the present invention may utilize other components consistent with the present invention. The present invention is also described in the context of providing a voltage higher than the supply voltage. However, one of ordinary skill in the art will readily recognize that the method and system may be used to provide reverse polarity voltages.

Figure 1:
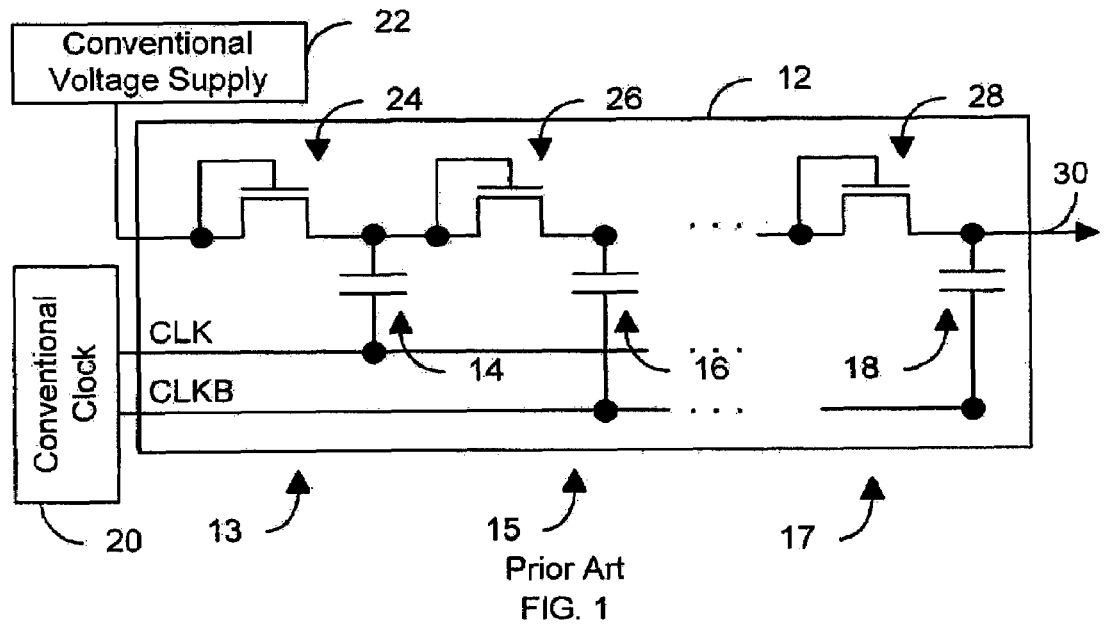
FIG. 1 is diagram depicting a conventional charge pump.
Figure 2:
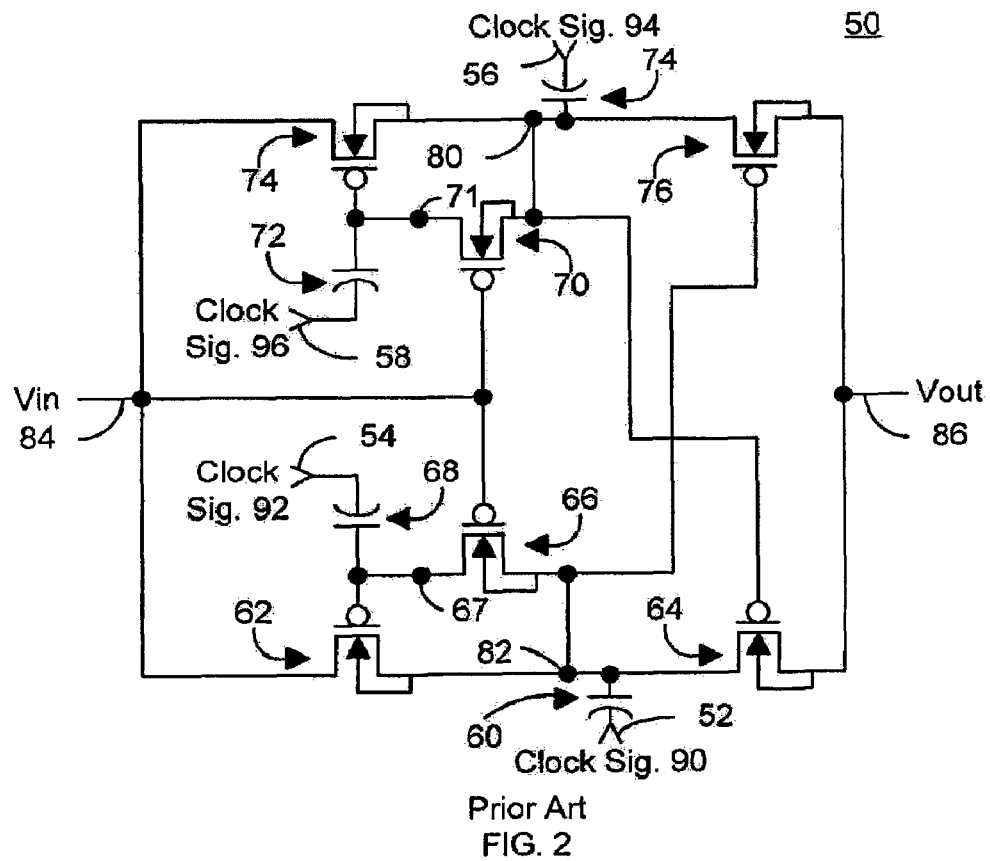
FIG. 2 is a diagram of a charge pump for use with lower supply voltages.
Figure 3:
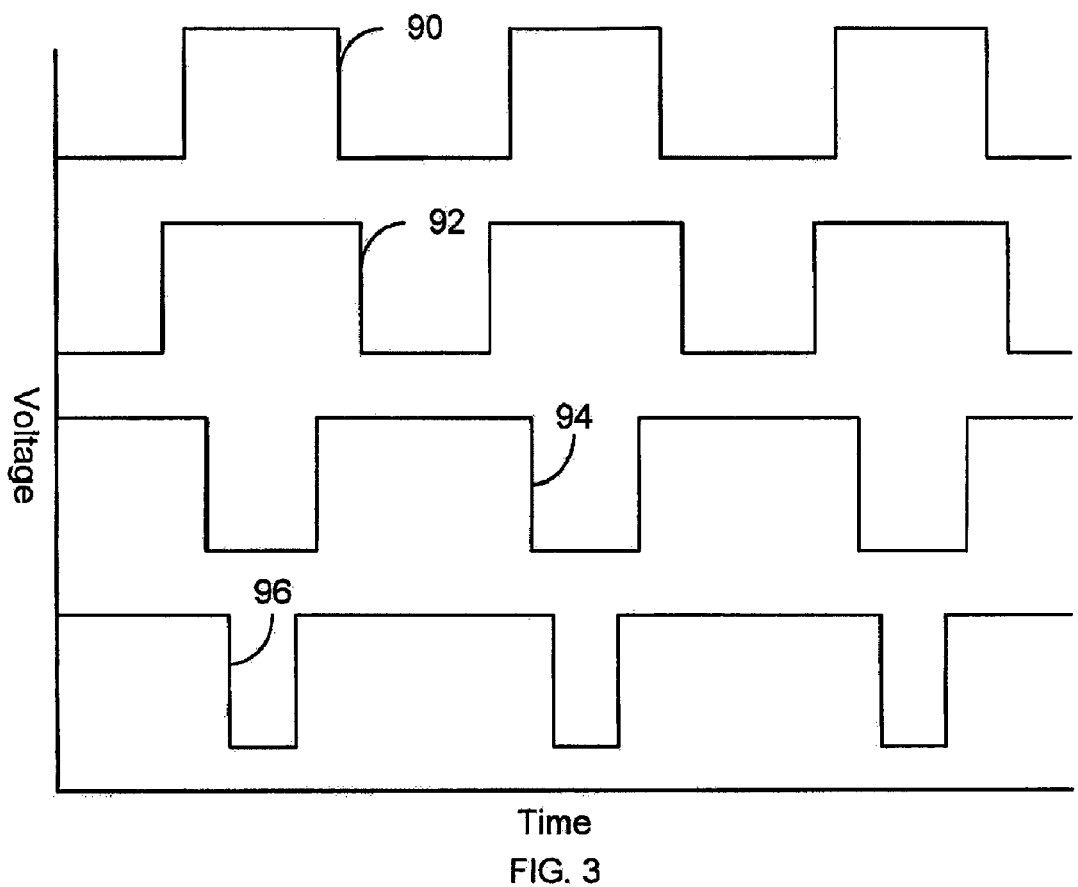
FIG. 3 is a diagram of clock signals for the charge pump fur use with lower supply voltages.

FIG. 2 is a diagram of a charge pump 50 for use with lower supply voltages. The charge pump 50 is one scheme that has been proposed to address the inability of conventional charge pumps, such as the charge pump 10, to operate as desired at low supply voltages. The charge pump 50 includes pumping capacitors 60 and 74, auxiliary capacitors 68 and 72, PMOS devices 62, 64, 66, 70, 74, 76, input 84 and output 86. In addition, the charge pump 50 utilizes inputs 52, 54, 56, and 58 for the four-phase clock signal. FIG. 3 depicts the clock signals 90, 92, 94, and 96. The input 84 receives an input voltage, $V_{in}$, that is preferably the supply voltage, $V_{dd}$.

Using the four phase clock signals 90, 92, 94, and 96, the limitations on gain per stage due to the threshold voltage and body effect of the PMOS devices 62, 64, 66, 70, 74, and 76 can be substantially reduced or eliminated. In operation, a maximum voltage drop that is lower than the supply voltage $V_{dd}$ is maintained on the PMOS devices 62, 64, 66, 70, 74, and 76. Thus, the charge pump 50 can produce a gain that is very close to $V_{dd}$. The gain per stage of the charge pump 50 is thus is limited only by parasitics. In addition, the PMOS devices 62, 64, 66, 70, 74, and 76 avoids limitations due to threshold voltage drop and body effect in NMOS devices because such limitations are not present with PMOS devices 62, 64, 66, 70, 74, and 76. Further, the voltage difference between all the nodes of the PMOS devices does not exceed $V_{dd}$ on the charge pump 50. Consequently, thick gate oxides or triple wells are not needed for the charge pump 50.

Although the charge pump 50 functions, one of ordinary skill in the art will recognize that there is a lower limit to the supply voltages with which the charge pump 50 functions as desired. For the charge pump 50, the following conditions hold: $V_{gate\text{-}source\ device\ 62} > V_t$, which means that $V_{node\ 84} - V_{node\ 67} > V_t$, where $V_t$ is the threshold voltage of a PMOS device 62, 64, 66, 70, 74, or 76. This conditions are analogous to $V_{gate\text{-}source\ device\ 74} > V_t$ and the $V_{node\ 84} - V_{node\ 71} > V_t$. Thus, when clock signals 90 and 92 are low, the voltage at the node 82 is $V_{in}$ and the voltage at node 67 is $V_{in} + V_t - V_{dd} * C_r$, where $C_r$ is $1/(1+C_{para}/C_{capacitor\ 68})$ and $C_{para}$ is the total parasitic capacitance at the node 67. In order for the conditions above to be satisfied, $V_{dd} > 2*V_t*(1+C_{para}/C_{aux})$. If the parasitic capacitance is low, then the supply voltage with which the charge pump 50 can be used may be as low as approximately $2*V_t$. Thus, the lower limit for the supply voltage $V_{dd}$ for the charge pump 50 is approximately $2*V_t$. This lower limit for the supply voltage at which the charge pump 50 functions may be higher than is desired for some applications.

Moreover, when the signal 90 or 94 is low and the signal 92 or 96, respectively, is high, the discharge of the voltage at the node 67 or the node 71, respectively, may be incomplete. This is because the node 71 has a voltage of $V_{in} + V_t$. Because the discharge of the node 67 or 71 is incomplete, the ability of the charge pump 50 may be further compromised at low supply voltages.

In addition, one of ordinary skill in the art will recognize that the charge pump 50 is desired to be used in memories having cells that may be characterized by a relatively large leakage current. As a result, it is desirable to provide a larger output current via the output 86. In the case where $V_{dd}$=1 volt and $V_t$ is approximately 0.4 volt, the charge pump 50 may be at or near its operating limit. As a result, the charge pump 50 may be unable to provide the desired output current. Consequently, it is still desirable to provide a mechanism for providing a voltage that is higher than the supply voltage in devices having a very low supply voltage.

Figure 4:
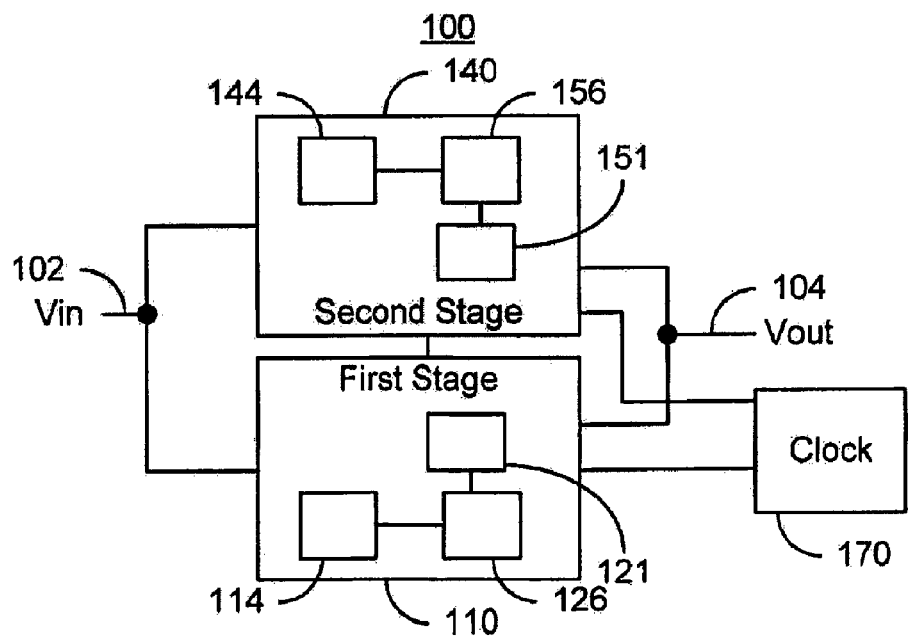
FIG. 4 is a diagram depicting one embodiment of a system in accordance with the present invention for providing a voltage higher than a supply voltage.

To more particularly describe the present invention, refer to FIG. 4, depicting one embodiment of a system 100 in accordance with the present invention for providing a voltage higher than a supply voltage. The system 100 is preferably a charge pump. The system 100 includes an input 102, an output 104, a first stage 110, and a second stage 140, which are driven by a clock 170. The clock provides a plurality of clock signals that are used to drive the first stage 110 and the second stage 140. In a preferred embodiment, six clock signals are used.

The first stage 110 includes at least one pumping node 114 that is preferably coupled with a pumping capacitor (not shown). Also in a preferred embodiment, the first stage includes auxiliary capacitor(s) 121 and a device 126 that is preferably a P-type device. The first stage is configured such that the pumping node 114 charges and fully discharges in response to a first portion of the plurality of clock signals provided by the clock 170. In a preferred embodiment, this is achieved using the auxiliary capacitor(s) 121 to undershoot the voltage on the gate of the device 126 during a portion of the period of the clock signals. Also in a preferred embodiment, the device 130 is a P-type device.

The second stage 140 is analogous to and coupled with the first stage 110. Consequently, the second stage 140 includes at least one pumping node 144 that is preferably coupled with a pumping capacitor (not shown). The second stage 140 also preferably includes auxiliary capacitor(s) 151 as well as a device 156 that is preferably a P-type device. The second stage is configured such that the pumping node 144 charges and fully discharges in response to a first portion of the plurality of clock signals provided by the clock 170. In a preferred embodiment, full discharge of the node(s) 158 is achieved using the auxiliary capacitor(s) 162 to undershoot the voltage on the gate of the device 156 during a portion of the period of the clock signals. In addition the first stage 110 and second stage 140 are configured to alternately charge and fully discharge the pumping nodes 114 and 144, respectively, in response to the clock signals from the clock 170.

Because of the configuration of the stages 110 and 140 as well as the clock signals from the clock 170, a high gain per stage may be achieved. This gain may be limited primarily by parasitic effects. In addition, degradation in the voltage provided due to the threshold voltage of the devices 126 and 156 may be avoided. Consequently, the system 100 may be used at very low supply voltages. In particular, the system 100 may function as desired for supply voltages that are greater than but approach the threshold voltage of the device 126 or 156. For example, for the charge pump 50, the supply voltage for desired operation is approximately $2V_t$. In contrast, the system 100 may operate as desired for supply voltage of approximately $V_t$. In addition, the gain for the system 100 is optimized such that $V_{out}=V_{in}+V_{dd}$. Thus, even at very low voltages, the system 100 may provide the desired high voltage with sufficient output current.

Figure 5:
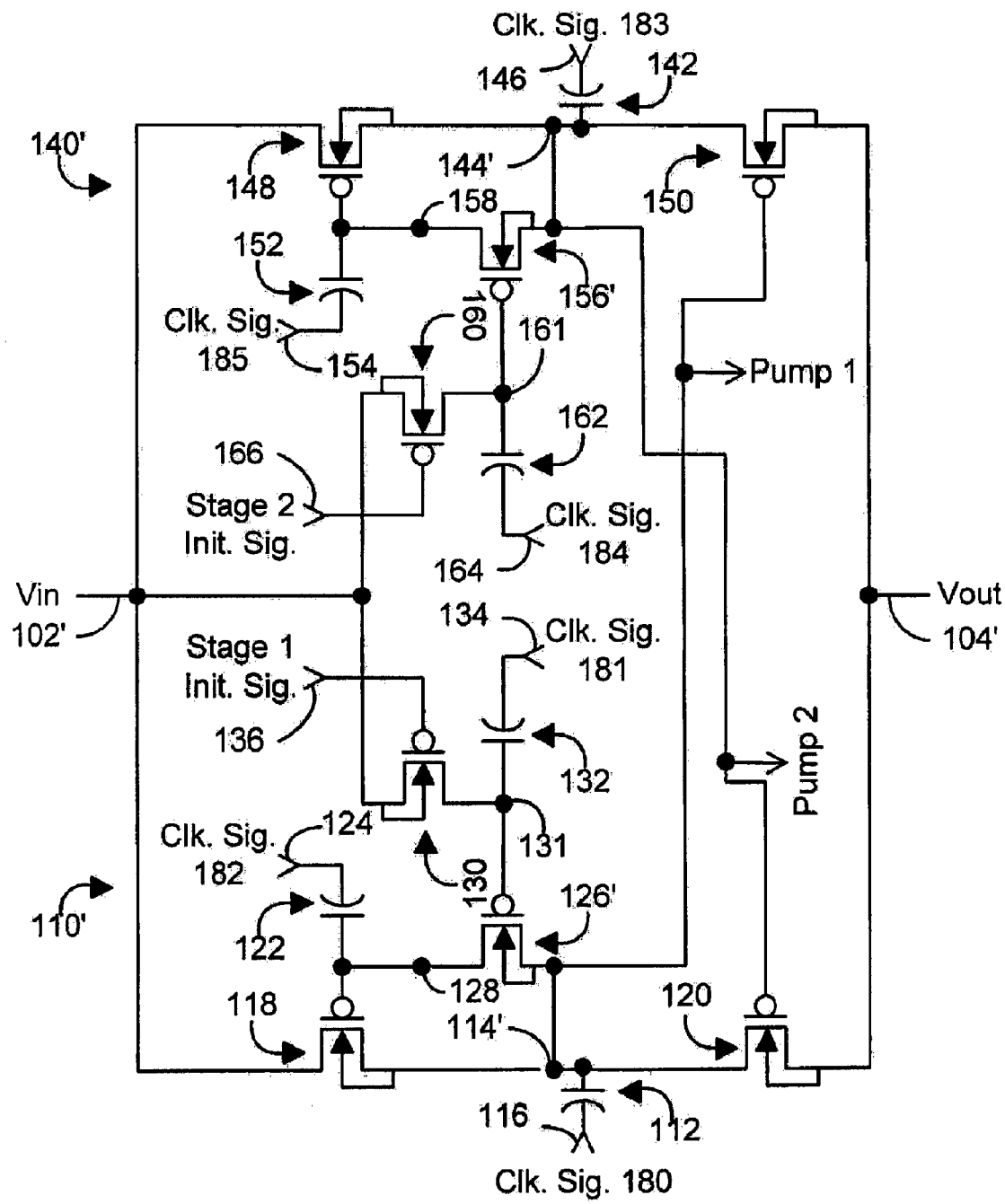
FIG. 5 is a diagram depicting a preferred embodiment of a system in accordance with the present invention for providing a voltage higher than a supply voltage at very low supply voltages.

FIG. 5 is a diagram depicting a preferred embodiment of a system 100' in accordance with the present invention for providing a voltage higher than a supply voltage. For clarity, the clock 170 is not explicitly shown. Only the signals provided are indicated. The system 100' includes inputs 102' that receives signal Vin, output 104' and stages 110' and 140'. The system 100' is a charge pump 100'. The stage 110' of the charge pump 100' includes pumping capacitor 112, auxiliary capacitors 122 and 132, PMOS devices 118, 120, 126', and 130, as well as inputs 116, 134, 136, and 124. In addition, the nodes 114' and 128 are also noted. The auxiliary capacitors 122 and 132 correspond to the auxiliary capacitor(s) 121 of FIG. 4. Referring back to FIG. 5, the stage 140' of the charge pump 100' includes pumping capacitor 142, auxiliary capacitors 152 and 162, PMOS devices 148, 150, 156', and 160, as well as inputs 146, 164, 166, and 154. The auxiliary capacitors 152 and 162 correspond to the auxiliary capacitor(s) 151 of FIG. 4. Referring back to FIG. 5, the nodes 144' and 158 are also noted. The inputs 136 and 166 receive an initialization signal for the node 144' and 114', respectively, of the previous stage 140' and 110', respectively. In addition, the components 112, 118, 120, 122, 126', 130, and 132 of the first phase 110' are preferably analogous to and have the size as their counterparts 142, 148, 150, 152, 156', 160, and 162, respectively, of the second phase 140'.

The pumping capacitors 112 and 142 are coupling capacitors that preferably have a large capacitance and are used for the basic charge pumping operation. Thus, in one embodiment, the pumping capacitors 112 and 142 have a capacitance on the order of 4 pF. The P-type devices 120 and 150 are used to transfer charge from the nodes 114' and 144', respectively, to the output 104' and to prevent reversal current feedback from the output 104 to the nodes 114' and 144', respectively. The P-type devices 118 and 148 are used to connect the nodes 114' and 144', respectively, to the input 102 when the clock signals input to inputs 116 and 146, respectively, are low and thus the capacitors 112 and 142, respectively are not pumped. The P-type devices 126' and 156', are used to switch the gates of the P-type devices 118 and 148, respectively, in order to prevent reversal current feedback to the input 102 when the pumping capacitors 112 and 142, respectively, are boosted. Auxiliary capacitors 132 and 162 preferably have a small capacitance and are used to generate an under shoot for the gate of the P-type devices 126' and 156', respectively. For example, in one embodiment, each of the auxiliary capacitors 132 and 162 has a capacitance on the order of 70 fF when the capacitance of the pumping capacitors 112 and 142 is on the order of 4 pF. Thus, the capacitances of the auxiliary capacitors 132 and 162 are significantly smaller than that of the pumping capacitors 112 and 142, respectively. Because of the undershoot for their gates, the potential at the gate of the P-type device 126' or 156' is lower than the voltage at the input 102'. Consequently, the node 128 or 158 is fully discharged to the node 114' or 144', respectively, when the clock provided to the inputs 124 or 152, respectively has a falling edge.

Figure 6:
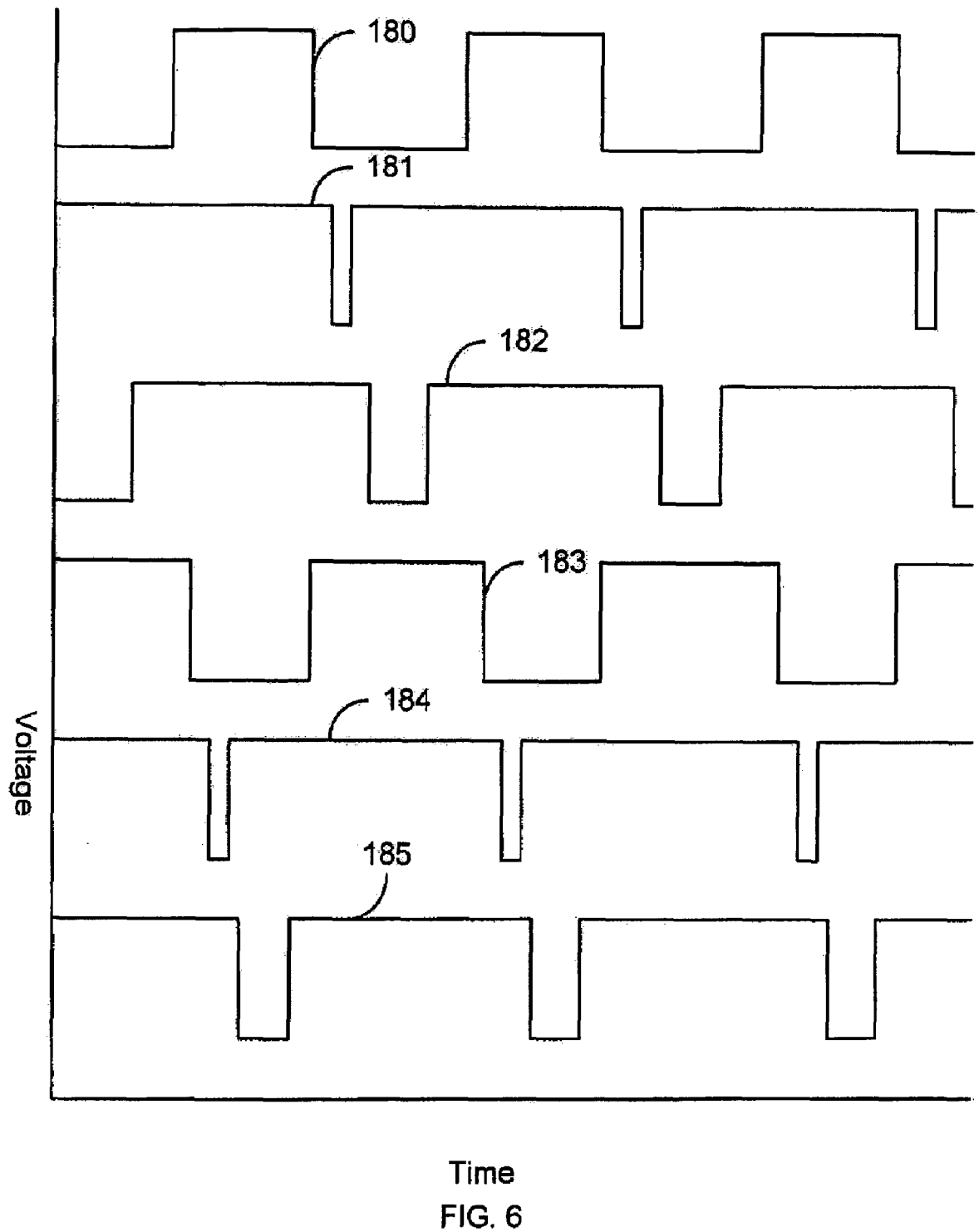
FIG. 6 is a diagram depicting clock signals for in one embodiment of a system in accordance with the present invention.

FIG. 6 is a diagram depicting clock signals 180, 181, 182, 183, 184, and 185 for in one embodiment of a system in accordance with the present invention. The clock signals 180, 181, 182, 183, 184, and 185 preferably vary between zero volts and the supply voltage, $V_{dd}$. Operation of the system 100' is described in the context of the clock signals 180, 181, 182, 183, 184, and 185. Referring to FIGS. 5 and 6, the capacitors 112 and 142 are preferably relatively large in size to transfer a greater amount of energy.

To further describe the operation of the charge pump 100', it can be assumed that initially, the clock signals 180 and 182 are low, while clock signals 181, 183, 184, and 185 are high. Thus, the nodes 144' and 158 are also initially at $V_{in}+V_{dd}$, where $V_{dd}$ is the supply voltage. The nodes 161 and 131 are at $V_{in}$. The node 114' is at $V_{in}$. The node 128 is at $V_{low}$, which is $V_{aux}-C_rV_{dd}$, where $V_{aux}$=Vin and $C_r=1/(1+C_{paraux}/C_{cap\ 122})$, Cparaux is the total parasitic capacitance at node 128 from the devices 118 and 126'. In addition, the inputs 136 and 166 receive and initialization signal. In embodiments in which multiple stages 110/110' and 140/140' are cascaded, as described below, the initialization signal may be from a previous stage 110/110' and 140/140'. In such a case, the initialization signal may be from the nodes corresponding to nodes 114' and 144', respectively, of a previous stage (not shown) or to the signals 183 and 180, respectively, only for the first stage. Consequently, the initial signal provided to node 136 is the voltage at node $144'-V_{dd}$. Similarly, the initial signal provided to the node 166 is the voltage at the node $114'-V_{dd}$.

The signal 182 switches high, to $V_{dd}$. Consequently, the node 128 rises to $V_{in}$ due to the coupling capacitor 122. The clock signal 180 switches high, to $V_{dd}$. Thus, the voltage at node 114' rises to $V_{in}+V_{dd}$. Similarly, the node 128 rises to $V_{in}+V_{dd}$, which is connected to the node 114' through the P-type device 126'. At substantially the same time, the P-type device 150 turns off and the node 161 keeps its initial value of $V_{in}$, but floats.

Next, the clock signal 183 goes low. As a result, the node 144' switches to Vin and the node 158 goes to Vauxi where $V_{auxi}-V_{in}+V_t$ through the P-type device 156'. Because the node 144' is at $V_{in}$, the P-type device 120 turns on and charge transfer occurs from the node 114' to the output 104'. Because the P-type devices 118 and 150 have their gates connected to $V_{in}+V_{dd}$, the P-type devices 118 and 150 are turned off and no reversal charge transfer occurs. The P-type device 130 is on and the voltage at node 131 is $V_{in}$. To reduce or eliminate the effects of a low $V_{dd}$, a dedicated phase is added to create a short pulse with the clock signal 184 on the coupling capacitor 162. This may allow all charge to be transferred from the node 158 to the node 144'. Consequently, the voltage at the node 158 decreases to $V_{aux}$, where $V_{aux}=V_{in}$. As a result, the charge pump 100' can function at a very low supply voltage.

Next, the voltage at the node 161 varies from $V_{in}$ to $V_{in}-C_3(V_{dd})$ during the falling edge of the clock signal 184 and from $V_{in}-C_3(V_{dd})$ to $V_{in}$ during the rising edge of the clock signal 184. The operator $C_3$ is $1/(1+C_{parasitic}/C_{162})$, where $C_{parasitic}$ is the parasitic capacitance at the node 161 due to the P-type devices 160 and 156.

During the last phase, the clock signal 185 goes low. As a result, the node 158 switches to a low voltage and the P-type device 148 turns on. Consequently, charge is transferred from the input 102' to the node 144', which will be the next pumped node. Thus, the first half of the period of operation may be completed. During the first half of the period, charge is transferred from the node 114' to the output 104' and from the input 102' to the node 144'. When this charge transfer is completed, a second half of the period is commenced. The second half of the period is symmetric with respect to the first half of the period. The second half of the period commences when the clock signal 185 is switched high. Switching the clock signal 185 high raises the node 158 to $V_{in}$. Next, the clock signal 183 pulses high to boost the node 144' to $V_{in}+V_{dd}$ as well as the node 158. Thereafter, the signal 180 pulses low, turning the P-type device 150 on and starting charge transfer from the node 144' to the output 104'. An undershoot for the voltage at the node 131 is generated by pulsing the clock signal 181 low to transfer the charge from the node 128 to the node 114'. The final portion of the period occurs when the clock signal 182 is switched low to turn the P-type device 118 on. Thus, during this second half of the period, charge from the input 102' to the node 114' and from the node 144' to the output 104'.

Thus, during the first half of the period for the clock signals depicted in FIG. 6, charge is transferred from the node 114' to the output 104'. At the same time, the node 144' receives charge from the input 102'. During the second half of the period, charge is transferred from the node 144' to the output 104'. At the same time, the node 114' receives charge from the input 102'. Thus, the stages 140' alternately charge and discharge. In addition, in order to ensure that the capacitors 112 and 142, and thus the nodes 128 and 158, are completely discharged, the auxiliary capacitors 132 and 162 are used. The auxiliary capacitors 132 and 162 generate an undershoot of the voltage on the gates of the P-type devices 126' and 156', respectively, during the falling edge of the clock signals 181 and 184, respectively. Thus, in the steady state operation of the charge pump 100', the pumping nodes 114' and 144' have a voltage that varies from $V_{in}$ to $V_{in}+C_1(V_{dd})$, where $C_1$ is $1/(1+C_{par}/C_{112})$ and $C_{par}$ is the parasitic capacitance at the node 114' due to the P-type devices 118, 120, 126', and 150. If it is assumed that the parasitic capacitance is small, then the variation in voltage at the pumping nodes 114' and 144' is approximately from $V_{in}$ to $V_{dd}$. Thus, the variation in voltage for the pumping nodes 114' and 144' may be as large as possible, while it is ensured that charge is transferred alternately from the nodes 114' and 144'.

Furthermore, in a preferred embodiment, to achieve the desired functionality the gate-source voltages of the P-type devices 118 and 148 are higher than the threshold voltage, $V_t$, for a very low supply voltage. This condition is fulfilled using the P-type devices 130 and 160 as well as the small auxiliary capacitors 132 and 162. Between the falling edges of clock signals 180 and 182, a pulse is provided on the clock signal 181 to enable charge transfer from node 128 to node 114' or from node 158 to node 144', respectively. While the clock signal 180 is low and the clock signal 182 is high, the node 128 is at Vin+Vt. Before the falling edge of the clock signal 182, a pulse is generated on the clock signal 181 is generated to decrease the potential at the node 128 or 158. At such a time, the voltage at the node 128 or 158 is preferably $V_{in}$. After the clock signal 182 has changed state to zero, the potential at the node 128 is Vin$-C_r(V_{dd})$, where $C_r$ is $1/(1+C_{para\ 128}/C_{aux})$, $C_{para\ 128}$ is the parasitic capacitance at the node 128, respectively due to the devices 118 and 126'.

Thus, the condition for the desired functionality can be seen as: $V_{gs}$ of P-type devices 118 and 148 is greater than $V_t$. In addition, the $V_{node\ 102}-V_{node\ 128}>V_t$ or $V_{node\ 102}-V_{node\ 158}>V_t$. In the event that the clock signals 180 and 182 are low and that a pulse for the clock signal 181 is generated between the falling edges of the clock signals 180 and 182. This situation results in $V_{node\ 128}=V_{in}-V_{dd}(C_r)$. Combining these conditions results in the minimum workable range of: $V_{dd}>V_t(1+C_{para\ 128}/C_{aux})$. For small parasitic capacitances, the lowest value of $V_{dd}$ is very close to $V_t$.

Thus, the charge pump 100' may be operated at very low voltages while providing a higher than supply voltage. As described above, the charge pump 100' can operate at supply voltages approaching $V_t$, which is an improvement even over the charge pump 50. Thus, degradation due to threshold voltage may be reduced or eliminated. The gain for the charge pump 100' is preferably limited by parasitic capacitances only, and the optimal gain for the charge pump 100' may be provided. Thus, the gain for the charge pump 100' is $V_{dd}$ ($V_{out}=V_{in}+V_{dd}$). Consequently, the charge pump 100' is suitable for very low voltage applications.

Figure 7:
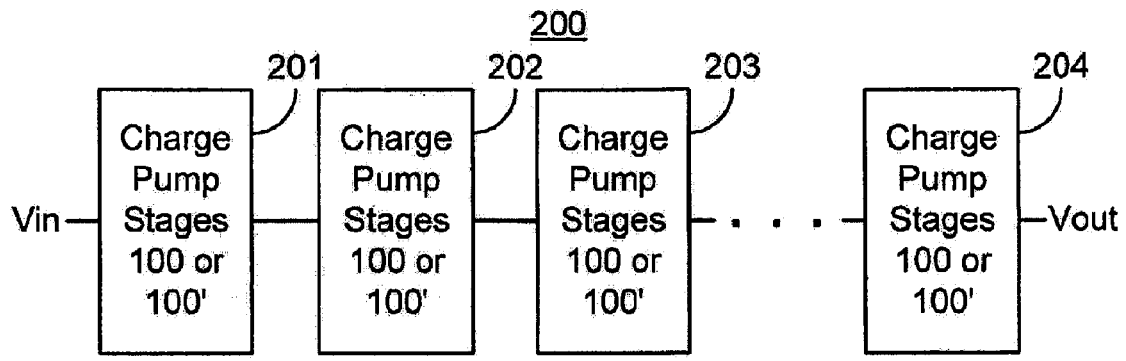
FIG. 7 is a diagram depicting one embodiment of a device using multiple systems in accordance with the present invention for providing a voltage higher than a supply voltage.

FIG. 7 is a diagram depicting one embodiment of a device 200 using multiple systems in accordance with the present invention for providing a voltage higher than a supply voltage. Thus, the device 200 includes stages 201, 202, 203, through 204. Each of the stages 201, 202, 203, through 204 corresponds to the charge pump 100 or 100', respectively. Consequently, the output voltages from one stage 201, 202, or 203 can be fed into input of the next stage 202, 203, or another stage such as the stage 204, respectively. The stages 201, 202, 203, and 204 may be driven by clock(s) (not shown) such as the clock 170. Furthermore, each of the stages 201, 202, 203, and 204 provides a gain of approximately $V_{dd}$. In addition, the equation Vout=Vin+N*$C_rV_{dd}$, where N is the number of stages, still holds, even for a weak supply voltage. The gain may thus be increased by cascading the stages 201, 202, 203, and 204. Consequently, the charge pump 100/100' may be scalable.

Figure 8:
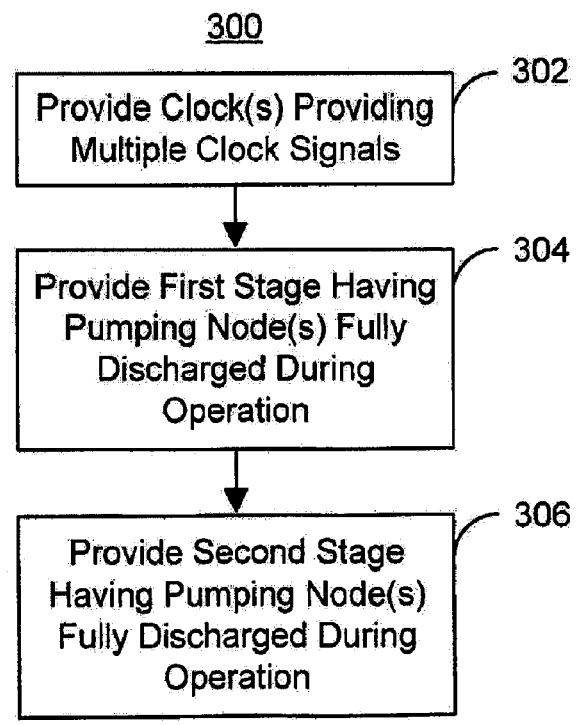
FIG. 8 is a flow chart depicting one embodiment of a method in accordance with the present invention for providing a system for providing a voltage higher than a supply voltage.

FIG. 8 is a flow chart depicting one embodiment of a method 300 in accordance with the present invention for providing a system for providing a voltage higher than a supply voltage. For clarity, the method 300 is described in the context of the system 100'. However, one of ordinary skill in the art that the method 300 may be used with other systems, including but not limited to the systems 100 and 200.

The clock 170 that drives the charge pump 100' is provided, via step 302. The clock provides a plurality of clock signals that are used to drive the first stage 110' and the second stage 140'. These multiple clock signals can otherwise be thought of as a clock signal having multiple, separate phases. In a preferred embodiment, a clock that provides six clock signals. Together, the clock signals provide a period of the system 100'. Further, each clock signal has transitions at different times from the remaining clock signals during the period. An example of one period of operation is shown in FIG. 6, described above.

The first stage 110' is provided, via step 304. Step 304 includes providing the pumping node(s) 114' that are preferably coupled with a pumping capacitor (not shown). Step 304 may also include providing auxiliary capacitor(s) 122 and a device 126' that is preferably a P-type device. The first stage is configured such that the pumping node 114' charges and fully discharges in response to a first portion of the plurality of clock signals provided by the clock 170. In a preferred embodiment, this is achieved using the auxiliary capacitor(s) 132 to undershoot the voltage on the gate of the device 126' during a portion of the period of the clock signals and a device 130 that is preferably a P-type device.

The second stage 140' is provided, via step 306. Step 306 is analogous to step 304 because the second stage is analogous to and coupled with the first stage 110'. Consequently, the second stage 140' includes at least one pumping node 144' that is preferably coupled with a pumping capacitor. Step 306 thus preferably includes providing auxiliary capacitor(s) 152 as well as a device 156' that is preferably a P-type device. The second stage is configured such that the pumping node 144' charges and fully discharges in response to a first portion of the plurality of clock signals provided by the clock 170. In a preferred embodiment, full discharge of the pumping node(s) 144' is achieved using the auxiliary capacitor(s) 162 to undershoot the voltage on the gate of the device 156' during a portion of the period of the clock signals and the device 160. In addition the first stage 110' and second stage 140' are configured to alternately charge and fully discharge the pumping nodes 114' and 144', respectively, in response to the clock signals from the clock 170. The steps 304-306 may then be optionally repeated to provide a semiconductor device, such as the device 200.

Thus, using the method 300, the system 100, 100' and/or 200 may be provided. As a result, the advantages of the systems 100, 100' and/or 200 may be achieved.

A method and system for providing an output voltage greater than a supply voltage provided by a voltage supply in semiconductor devices, such as EEPROMs. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A system for providing an output voltage greater than a voltage provided by a voltage supply in a semiconductor device, the system comprising:
   a clock coupled to provide a plurality of clock signals;
   a first stage including:
      a first pumping node coupled to a first pumping capacitor;
      a first input P-type device coupled between an input and the first pumping node to transfer charge from the input to the first pumping capacitor;
      a first middle P-type device coupled between the first pumping node and a gate of the first input P-type device to transfer charge from the first pumping capacitor to the gate of the first input P-type device to turn off the first input P-type device; and
      a first auxiliary device coupled to a gate of the first middle P-type device to lower a voltage at the gate of the first middle P-type device to an undershoot voltage to turn on the first middle P-type device to transfer charge from the gate of the first input P-type device to the first pumping capacitor; and
   a second stage coupled with the first stage and including a second pumping node, the clock being coupled to provide a first portion of the plurality of clock signals to the first stage and a second portion of the plurality of clock signals to the second stage, the first stage and the second stage being configured to alternately transfer charge to the output based on the plurality of clock signals.

2. The system of claim 1, further comprising:
   a first output P-type device coupled between the first pumping node and an output to transfer charge from the first pumping capacitor to the output;
   a second auxiliary capacitor coupled between one of the first portion of the plurality of clock signals and the gate of the first input P-type device to raise a voltage at the gate of the first input P-type device in response to one of the first portion of the plurality of clock signals; and
   wherein the first pumping capacitor is coupled between the first pumping node and one of the first portion of the plurality of clock signals to raise a voltage on the first pumping node in response to one of the first portion of the plurality of clock signals.

3. The system of claim 1 wherein the first stage further includes a first stage initialization input coupled to a gate of a first initialization P-type device, the first initialization P-type device being coupled between the input, the first auxiliary device, and the gate of the first middle P-type device to couple an initial voltage to the gate of the first middle P-type device and the first auxiliary device.

4. The system of claim 3 wherein the first auxiliary device includes a first auxiliary capacitor coupled between one of the first portion of the plurality of clock signals and the gate of the first middle P-type device.

5. The system of claim 1 wherein:
   the first middle P-type device has a threshold voltage; and
   a voltage of the voltage supply has a lower limit corresponding to the threshold voltage of the first middle P-type device.

6. The system of claim 1 wherein the plurality of clock signals includes six clock signals.

7. The system of claim 1 further comprising:
   at least a third stage corresponding to the first stage, the third stage being coupled in series with the first stage; and
   at least a fourth stage corresponding to the second stage, the fourth stage being coupled in series with the second stage.

8. A system for providing an output voltage greater than a voltage provided by a voltage supply in a semiconductor device, the system comprising:
   a first stage including:
      a first pumping node coupled to a first pumping capacitor;
      a first input P-type device coupled between an input and the first pumping node to transfer charge from the input to the first pumping capacitor;
      a first middle P-type device coupled between the first pumping node and a gate of the first input P-type device to transfer charge from the first pumping capacitor to the gate of the first input P-type device to turn off the first input P-type device; and
      a first auxiliary device coupled to a gate of the first middle P-type device to lower a voltage at the gate of the first middle P-type device to an undershoot voltage to turn on the first middle P-type device to transfer charge from the gate of the first input P-type device to the first pumping capacitor;
   a second stage coupled with the first stage and including:
      a second pumping node coupled to a second pumping capacitor;

a second input P-type device coupled between the input and the second pumping node to transfer charge from the input to the second pumping capacitor;

a second middle P-type device coupled between the second pumping node and a gate of the second input P-type device to transfer charge from the second pumping capacitor to the gate of the second input P-type device to turn off the second input P-type device; and a second auxiliary device coupled to a gate of the second middle P-type device to lower a voltage at the gate of the second middle P-type device to an undershoot voltage to turn on the second middle P-type device to transfer charge from the gate of the second input P-type device to the second pumping capacitor; and at least one clock coupled to the first stage and the second stage, the at least one clock being coupled to provide a plurality of clock signals, a first portion of the plurality of clock signals being coupled to the first stage and a second portion of the plurality of clock signals being coupled to the second stage, the first stage and the second stage being configured to alternately charge and discharge the first pumping node and the second pumping node based on the plurality of clock signals.

9. The system of claim 8 wherein:

the first auxiliary device includes a first auxiliary capacitor coupled between a first one of the first portion of the plurality of clock signals and the gate of the first middle P-type device; and the second auxiliary device includes a second auxiliary capacitor coupled between a first one of the second portion of the plurality of clock signals and the gate of the second middle P-type device.

10. The system of claim 8, further comprising:

a first stage initialization input coupled to a gate of a first initialization P-type device, the first initialization P-type device being coupled between the input, the first auxiliary device, and the gate of the first middle P-type device to couple an initial voltage to the gate of the first middle P-type device and the first auxiliary device; and a second stage initialization input coupled to a gate of a second initialization P-type device, the second initialization P-type device being coupled between the input, the second auxiliary device, and the gate of the second middle P-type device to couple an initial voltage to the gate of the second middle P-type device and the second auxiliary device.

11. The system of claim 10 further comprising:

a first output P-type device coupled between the first pumping node and an output to transfer charge from the first pumping capacitor to the output;

a third auxiliary capacitor coupled between a second one of the first portion of the plurality of clock signals and the gate of the first input P-type device to raise a voltage at the gate of the first input P-type device in response to the second one of the first portion of the plurality of clock signals;

a second output P-type device coupled between the second pumping node and the output to transfer charge from the second pumping capacitor to the output;

a fourth auxiliary capacitor coupled between a second one of the second portion of the plurality of clock signals and the gate of the second input P-type device to raise a voltage at the gate of the second input P-type device in response to the second one of the second portion of the plurality of clock signals; and wherein the first pumping capacitor is coupled between the first pumping node and a third one of the first portion of the plurality of clock signals to raise a voltage on the first pumping node in response to the third one of the first portion of the plurality of clock signals; and wherein the second pumping capacitor is coupled between the second pumping node and a third one of the second portion of the plurality of clock signals to raise a voltage on the second pumping node in response to the third one of the second portion of the plurality of clock signals.

12. A method for providing an output voltage greater than a voltage provided by a voltage supply in a semiconductor device, the method comprising:

transferring charge from an input to an output through a first stage including:

transferring charge from the input to a first pumping capacitor through a first input P-type device;

raising a potential of the first pumping capacitor with a first clock signal coupled to the first pumping capacitor;

transferring charge from the first pumping capacitor to a gate of the first input P-type device through a first middle P-type device to turn off the first input P-type device;

transferring charge from the first pumping capacitor to the output through a first output P-type device; and lowering a voltage at a gate of the first middle P-type device to an undershoot voltage with a first auxiliary device coupled to the gate of the first middle P-type device to turn on the first middle P-type device to transfer charge from the gate of the first input P-type device to the first pumping capacitor.

13. The method of claim 12, further comprising:

transferring charge from the input to the gate of the first middle P-type device and the first auxiliary device through a first initialization P-type device in response to a second clock signal coupled to a gate of the first initialization P-type device.

14. The method of claim 12 further comprising transferring charge from the input to the output through a second stage including:

transferring charge from the input to a second pumping capacitor through a second input P-type device;

raising a potential of the second pumping capacitor with a third clock signal coupled to the second pumping capacitor;

transferring charge from the second pumping capacitor to a gate of the second input P-type device through a second middle P-type device to turn off the second input P-type device;

transferring charge from the second pumping capacitor to the output through a second output P-type device; and lowering a voltage at a gate of the second middle P-type device to an undershoot voltage with a second auxiliary device coupled to the gate of the second middle P-type device to turn on the second middle P-type device to transfer charge from the gate of the second input P-type device to the second pumping capacitor.

15. The method of claim 12, further comprising providing the voltage from the voltage supply to have a lower limit corresponding to a threshold voltage of the first middle P-type device.

16. The method of claim 12 further comprising generating six clock signals to control the provision of the output voltage.

17. The method of claim 12, further comprising:

transferring charge from the input to the output through a second stage alternately with the first stage;

transferring charge from the output to a further output through a third stage; and transferring charge from the output to the further output through a fourth stage alternately with the third stage.

18. A method for providing an output voltage greater than a voltage provided by a voltage supply in a semiconductor device, the method comprising:

providing a first stage including:
- a first pumping node coupled to a first pumping capacitor;
- a first input P-type device coupled between an input and the first pumping node to transfer charge from the input to the first pumping capacitor;
- a first middle P-type device coupled between the first pumping node and a gate of the first input P-type device to transfer charge from the first pumping capacitor to the gate of the first input P-type device to turn off the first input P-type device; and
- a first auxiliary capacitor coupled to a gate of the first middle P-type device to lower a voltage at the gate of the first middle P-type device to an undershoot voltage to turn on the first middle P-type device to transfer charge from the gate of the first input P-type device to the first pumping capacitor;

providing a second stage coupled with the first stage and including:
- a second pumping node coupled to a second pumping capacitor;
- a second input P-type device coupled between the input and the second pumping node to transfer charge from the input to the second pumping capacitor;
- a second middle P-type device coupled between the second pumping node and a gate of the second input P-type device to transfer charge from the second pumping capacitor to the gate of the second input P-type device to turn off the second input P-type device; and
- a second auxiliary capacitor coupled to a gate of the second middle P-type device to lower a voltage at the gate of the second middle P-type device to an undershoot voltage to turn on the second middle P-type device to transfer charge from the gate of the second input P-type device to the second pumping capacitor; and providing a first portion of a plurality of clock signals to the first stage and a second portion of the plurality of clock signals to the second stage to control the first stage and the second stage to alternately charge and discharge the first pumping node and the second pumping node based on the plurality of clock signals.

19. A method for providing an output voltage greater than a voltage provided by a voltage supply in a semiconductor device, the method comprising:

transferring charge from an input to an output through a first stage including:
- transferring charge from the input to a first pumping capacitor through a first input P-type device;
- raising a potential of the first pumping capacitor with a first clock signal coupled to the first pumping capacitor;
- transferring charge from the first pumping capacitor to a gate of the first input P-type device through a first middle P-type device to turn off the first input P-type device;
- transferring charge from the first pumping capacitor to the output through a first output P-type device; and
- lowering a voltage at a gate of the first middle P-type device to an undershoot voltage with a first auxiliary device coupled to the gate of the first middle P-type device to turn on the first middle P-type device to transfer charge from the gate of the first input P-type device to the first pumping capacitor; and transferring charge from the input to the output through a second stage including:
- transferring charge from the input to a second pumping capacitor through a second input P-type device;
- raising a potential of the second pumping capacitor with a second clock signal coupled to the second pumping capacitor;
- transferring charge from the second pumping capacitor to a gate of the second input P-type device through a second middle P-type device to turn off the second input P-type device;
- transferring charge from the second pumping capacitor to the output through a second output P-type device when the output is not receiving charge from the first pumping capacitor; and
- lowering a voltage at a gate of the second middle P-type device to an undershoot voltage with a second auxiliary device coupled to the gate of the second middle P-type device to turn on the second middle P-type device to transfer charge from the gate of the second input P-type device to the second pumping capacitor.

20. The method of claim 19 wherein:

lowering a voltage at a gate of the first middle P-type device includes lowering the voltage at the gate of the first middle P-type device to the undershoot voltage with a third clock signal coupled to a first auxiliary capacitor, the first auxiliary capacitor being coupled to the gate of the first middle P-type device; and lowering a voltage at a gate of the second middle P-type device includes lowering the voltage at the gate of the second middle P-type device to the undershoot voltage with a fourth clock signal coupled to a second auxiliary capacitor, the second auxiliary capacitor being coupled to the gate of the second middle P-type device.

21. The method of claim 19, further comprising:

transferring charge from the input to the gate of the first middle P-type device and the first auxiliary device through a first initialization P-type device in response to a fifth clock signal coupled to a gate of the first initialization P-type device; and transferring charge from the input to the gate of the second middle P-type device and the second auxiliary device through a second initialization P-type device in response to a sixth clock signal coupled to a gate of the second initialization P-type device.

22. The method of claim 19, further comprising:

raising a voltage at the gate of the first input P-type device in response to a seventh clock signal coupled to a third auxiliary capacitor, the third auxiliary capacitor being coupled to the gate of the first input P-type device;

raising a voltage at the gate of the second input P-type device in response to an eighth clock signal coupled to a fourth auxiliary capacitor, the fourth auxiliary capacitor being coupled to the gate of the second input P-type device;

coupling the potential of the first pumping capacitor to a gate of the second output P-type device to turn off the second output P-type device when transferring charge from the first pumping capacitor to the output; and coupling the potential of the second pumping capacitor to a gate of the first output P-type device to turn off the first output P-type device when transferring charge from the second pumping capacitor to the output.

23. A system comprising:
a first input P-type device coupled between an input and a first pumping capacitor to transfer charge from the input to the first pumping capacitor;
a first middle P-type device coupled between the first pumping capacitor and a gate of the first input P-type device to transfer charge from the first pumping capacitor to the gate of the first input P-type device to turn off the first input P-type device; and
a first auxiliary device coupled to a gate of the first middle P-type device to lower a voltage at the gate of the first middle P-type device to an undershoot voltage to turn on the first middle P-type device to transfer charge from the gate of the first input P-type device to the first pumping capacitor.

24. The system of claim 23 wherein the system further comprises an initialization input coupled to a gate of a first initialization P-type device, the first initialization P-type device being coupled between the input, the first auxiliary device, and the gate of the first middle P-type device to couple an initial voltage to the gate of the first middle P-type device and the first auxiliary device.

25. The system of claim 23, further comprising a clock coupled to provide a plurality of clock signals to a first stage including the first pumping capacitor, the first input P-type device, the first middle P-type device, and the first auxiliary device.

26. The system of claim 25, further comprising a second stage including a second pumping capacitor, the clock being coupled to provide a first portion of the plurality of clock signals to the first stage and a second portion of the plurality of clock signals to the second stage, the first stage and the second stage being configured to alternately transfer charge to an output based on the plurality of clock signals.

27. The system of claim 23 wherein the first auxiliary device includes a capacitor coupled between a clock signal and the gate of the first middle P-type device.

28. A method comprising:
transferring charge from an input to a first pumping capacitor through a first input P-type device;
transferring charge from the first pumping capacitor to a gate of the first input P-type device through a first middle P-type device to turn off the first input P-type device; and
lowering a voltage at a gate of the first middle P-type device to an undershoot voltage with a first auxiliary device coupled to the gate of the first middle P-type device to turn on the first middle P-type device to transfer charge from the gate of the first input P-type device to the first pumping capacitor.

29. The method of claim 28, further comprising:
raising a potential of the first pumping capacitor with a first clock signal coupled to the first pumping capacitor; and
transferring charge from the first pumping capacitor to an output through a first output P-type device.

30. The method of claim 29, further comprising:
transferring charge from the input to the output through a first stage including transferring charge from the input to the first pumping capacitor and transferring charge from the first pumping capacitor to the output; and
transferring charge from the input to an output through a second stage alternately with the first stage.

31. The method of claim 28, further comprising transferring charge from the input to the gate of the first middle P-type device and the first auxiliary device through a first initialization P-type device in response to a second clock signal coupled to a gate of the first initialization P-type device.

32. The method of claim 28 wherein lowering a voltage at a gate of the first middle P-type device to an undershoot voltage includes lowering the voltage at the gate of the first middle P-type device to the undershoot voltage with a capacitor coupled between a third clock signal and the gate of the first middle P-type device.

* * * * *

UNITED STATES PATENT AND TRADEMARK OFFICE
CERTIFICATE OF CORRECTION

PATENT NO. : 7,855,591 B2  Page 1 of 1
APPLICATION NO. : 11/449052
DATED : December 21, 2010
INVENTOR(S) : Emmanuel Racape It is certified that error appears in the above-identified patent and that said Letters Patent is hereby corrected as shown below:

On the face page, in field (54), in "Title", in column 1, line 2, after "PUMP" insert -- FOR --.

In column 1, line 2, after "PUMP" insert -- FOR --.

Signed and Sealed this
Twenty-ninth Day of March, 2011

David J. Kappos
*Director of the United States Patent and Trademark Office*